United States Patent
Rash et al.

(10) Patent No.: US 9,507,718 B2
(45) Date of Patent: Nov. 29, 2016

(54) INTELLIGENT CACHING

(71) Applicant: Facebook, Inc., Menlo Park, CA (US)

(72) Inventors: Samuel Rash, Fremont, CA (US);
Timothy Williamson, Palo Alto, CA (US)

(73) Assignee: Facebook, Inc., Menlo Park, CA (US)

(*) Notice: Subject to any disclaimer, the term of this patent is extended or adjusted under 35 U.S.C. 154(b) by 270 days.

(21) Appl. No.: 13/864,016

(22) Filed: Apr. 16, 2013

(65) Prior Publication Data

US 2014/0310470 A1    Oct. 16, 2014

(51) Int. Cl.
*G06F 12/08* (2016.01)
*G06F 12/12* (2016.01)

(52) U.S. Cl.
CPC ........... *G06F 12/0862* (2013.01); *G06F 12/12* (2013.01); *G06F 12/123* (2013.01); *G06F 2212/1016* (2013.01); *G06F 2212/163* (2013.01); *G06F 2212/6024* (2013.01)

(58) Field of Classification Search
CPC ........... G06F 17/30348; G06F 17/276; G06F 17/30696; G06F 17/3028; G06F 12/0862; G06F 17/30902; G06F 17/30; G06F 17/3056
USPC .......... 711/126; 709/203; 707/E17.014, 740, 707/772, 999.003, 999.004; 1/1
See application file for complete search history.

(56) References Cited

U.S. PATENT DOCUMENTS

| | | | |
|---|---|---|---|
| 6,493,718 B1 * | 12/2002 | Petculescu | G06F 17/3048 707/600 |
| 2008/0086469 A1 * | 4/2008 | Gu et al. | 707/6 |
| 2009/0094200 A1 * | 4/2009 | Baeza-Yates | G06F 17/30902 |
| 2011/0055202 A1 * | 3/2011 | Heimendinger | G06F 17/30424 707/721 |
| 2011/0055264 A1 * | 3/2011 | Sundelin | G06Q 10/107 707/776 |
| 2011/0258049 A1 * | 10/2011 | Ramer | G06F 17/30867 705/14.66 |
| 2012/0054172 A1 * | 3/2012 | Agrawal | H04W 4/18 707/713 |
| 2014/0143501 A1 * | 5/2014 | Creamer et al. | 711/136 |

* cited by examiner

*Primary Examiner* — Yaima Rigol
*Assistant Examiner* — Edward Waddy, Jr.
(74) *Attorney, Agent, or Firm* — Perkins Coie LLP

(57) ABSTRACT

Disclosed are methods, systems, paradigms and structures for managing cache memory in computer systems. Certain caching techniques anticipate queries and caches the data that may be required by the anticipated queries. The queries are predicted based on previously executed queries. The features of the previously executed queries are extracted and correlated to identify a usage pattern of the features. The prediction model predicts queries based on the identified usage pattern of the features. The disclosed method includes purging data from the cache based on predefined eviction policies that are influenced by the predicted queries. The disclosed method supports caching time series data. The disclosed system includes a storage unit that stores previously executed queries and features of the queries.

19 Claims, 6 Drawing Sheets

SELECT   <count (appID), user ID, gender, age, country>  ~ 305
FROM     <applications_table>  ~ 310
FILTER   <country_USA>  ~ 315
RANGE    <start_date> <end_date>  ~ 320
WINDOW SIZE  <hourly>  ~ 325

*FIG. 3*

INTELLIGENT CACHING

FIELD OF INVENTION

This invention generally relates to caching data in computer related technologies. More specifically, the invention relates to intelligently caching data for anticipated queries.

BACKGROUND

In computer related technologies, certain applications such as reports are generated to obtain information on various aspects. For example, in a social networking environment reports may be generated for obtaining information such as the list of users who visited a particular website over a predefined period, number of comments made by users in the last hour, etc. The information presented in the reports is retrieved from a database. Obtaining results from the database every time a report is generated consumes significant computing resources and causes a significant delay.

Further, processing the data retrieved from the database to a form as required by the report incurs additional computing resources further delaying the generation of the report. If the reports are generated often and at regular intervals, such delays may affect the user experience. Some caching techniques have been suggested to cache frequently retrieved data. The prior caching techniques are not efficient in terms of managing the cache. For example, the prior caching techniques are not efficient in determining the kind of data to be cached, amount of data to be cached, a duration for which the data has to be cached, determining a portion of data that has to be purged, etc.

While the prior caching techniques address loading data that is retrieved frequently, they are inefficient in preloading data for anticipated queries. Further, the prior caching techniques are not efficient in managing time series data.

SUMMARY

Introduced here are methods, systems, paradigms and structures for managing cache memory in computer systems. Certain methods include caching (a) data that is frequently requested and (b) data that may be requested in the future by an application or a user. The data can include raw data obtained from a data storage unit and/or further processed data. One possible intelligent caching technique anticipates queries, pre-computes the result for the anticipated queries, and caches the result in a cache memory of the computer system. In another method, the non pre-computed results, also referred to as intermediate results, may also be cached. The intermediate results may be useful for serving different queries which request similar data in different ways. The method further includes purging the data in the cache memory based on predictions.

The anticipated queries are predicted using the knowledge of previously executed queries in the computer system. A query includes features that characterize the query. One method includes extracting features of the previously executed queries and correlating the extracted features to identify a usage pattern of the features. A prediction model predicts anticipated queries based on the identified usage pattern of the features. The data for the anticipated queries is retrieved from a storage unit such as a database and stored in the cache memory either in raw format or processed format. The queries executed in the system and the extracted features of the queries can be stored in a storage unit of the computer system.

Some embodiments of the invention have other aspects, elements, features, and steps in addition to or in place of what is described above. These potential additions and replacements are described throughout the rest of the specification.

BRIEF DESCRIPTION OF THE DRAWINGS

FIG. 3 is an example query that may be executed in the environment of FIG. 1.

DETAILED DESCRIPTION

References in this description to "an embodiment", "one embodiment", or the like, mean that the particular feature, function, or characteristic being described is included in at least one embodiment of the present invention. Occurrences of such phrases in this specification do not necessarily all refer to the same embodiment, nor are they necessarily mutually exclusive.

Disclosed are methods, systems, paradigms and structures for managing cache memory in computer system. Certain methods include caching (a) data that is frequently requested and (b) data that may be requested in the future by an application or a user. The data can include raw data obtained from a data storage unit and/or further processed data. One possible intelligent caching technique anticipates queries, pre-computes the result for the anticipated queries, and caches the result in a cache memory of the computer system. The method further includes purging the data in the cache memory based on predictions.

The anticipated queries are predicted using the knowledge of previously executed queries in the computer system. A query includes features that characterize the query. One method includes extracting features of the previously executed queries and correlating the extracted features to identify a usage pattern of the features. A prediction model predicts anticipated queries based on the identified usage pattern of the features. The data for the anticipated queries is retrieved from a storage unit such as a database and stored in the cache memory either in raw format or processed format. The queries executed in the system and the extracted features of the queries can be stored in a storage unit of the computer system.

Figure 1:
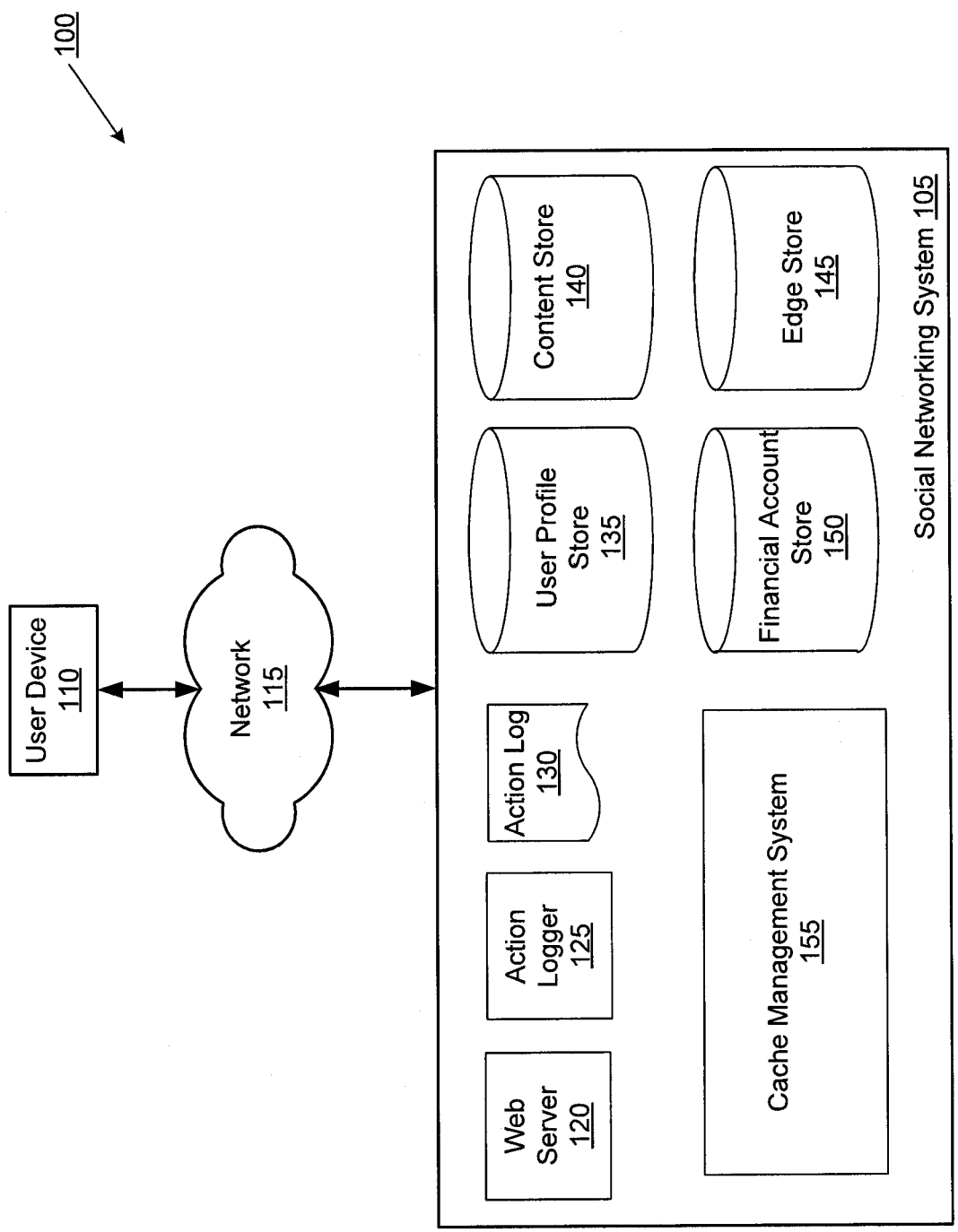
FIG. 1 is an environment in which an embodiment of the invention may operate.

FIG. 1 is an environment 100 including a social networking system 105 with which some embodiments of the present invention may be utilized, according to an embodiment of the disclosed technique. The system environment 100 includes a user device 110 interacting with a social networking system 105 over a network 115. In other embodiments, the system environment 100 may include different and/or additional components than those shown by FIG. 1.

The social networking system 105 comprises one or more computing devices storing user profiles associated with users and/or other objects as well as connections between users and other users and/or objects. In use, users join the social networking system 105 and then add connections to other users or objects of the social networking system to which they desire to be connected. As further described below, users of the social networking system 105 may be individuals or entities such as businesses, organizations, universities, manufacturers. The social networking system 105 allows its users to interact with each other as well as with other objects maintained by the social networking system 105. In some embodiments, the social networking system 105 allows users to interact with third-party websites and financial account providers.

Based on stored data about users, objects and connections between users and/or objects, the social networking system 105 generates and maintains a "social graph." comprising a plurality of nodes interconnected by a plurality of edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 105 modifies edges connecting the various nodes to reflect the interactions.

A user device 110 is a computing device capable of receiving user input as well as transmitting and/or receiving data via the network 115. In one embodiment, the user device 110 is a conventional computer system, such as a desktop or laptop computer. In another embodiment, the user device 110 may be a device having computer functionality, such as a personal digital assistant (PDA), mobile telephone, smart-phone or similar device. The user device 110 is configured to communicate with the social networking system 105, and/or the financial account provider via the network 115. In one embodiment, the user device 110 executes an application allowing a user of the user device 110 to interact with the social networking system 105. For example, the user device 110 executes a browser application to enable interaction between the user device 110 and the social networking system 105 via the network 115. In another embodiment, a user device 110 interacts with the social networking system 105 through an application programming interface (API) that runs on the native operating system of the user device 110, such as IOS® or ANDROID™.

The user device 110 are configured to communicate via the network 115, which may comprise any combination of local area and/or wide area networks, using both wired and wireless communication systems. In one embodiment, the network 115 uses standard communications technologies and/or protocols. Thus, the network 115 may include links using technologies such as Ethernet, 102.11, worldwide interoperability for microwave access (WiMAX), 3G, 4G, CDMA, digital subscriber line (DSL), etc. Similarly, the networking protocols used on the network 115 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 115 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec).

The social networking system 105 includes a web server 120, an action logger 125, an action log 130, a user profile store 135, a content store 140, an edge store 145, a financial account store 150, and a cache management system 155. In other embodiments, the social networking system 105 may include additional, fewer, or different modules for various applications. Conventional components such as network interfaces, security mechanisms, load balancers, failover servers, management and network operations consoles, and the like are not shown so as to not obscure the details of the system architecture.

Web server 120 links social networking system 105 via network 115 to one or more user devices 110; the web server 120 serves web pages, as well as other web-related content, such as Java, Flash, XML, and so forth.

Each user of the social networking system 105 is associated with a user profile, which is stored in the user profile store 135. A user profile includes declarative information about the user that was explicitly shared by the user, and may also include profile information inferred by the social networking system 105. In one embodiment, a user profile includes multiple data fields, each data field describing one or more attributes of the corresponding user of the social networking system 105. The user profile information stored in user profile store 135 describes the users of the social networking system 105, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 105 displayed in an image. A user profile in the user profile store 135 may also maintain references to actions by the corresponding user performed on content items in the content store 140 and stored in the edge store 145.

A user profile may be associated with one or more financial accounts, allowing the user profile to include data retrieved from or derived from a financial account. A user may specify one or more privacy settings, which are stored in the user profile, that limit information from a financial account that the social networking system 105 is permitted to access. For example, a privacy setting limits the social networking system 105 to accessing the transaction history of the financial account and not the current account balance. As another example, a privacy setting limits the social networking system 105 to a subset of the transaction history of the financial account, allowing the social networking system 105 to access transactions within a specified time range, transactions involving less than a threshold transaction amounts, transactions associated with specified vendor identifiers, transactions associated with vendor identifiers other than specified vendor identifiers or any suitable criteria limiting information from a financial account identified by a user that is accessible by the social networking system 105. In one embodiment, information from the financial account is stored in the user profile store 135. In other embodiments, it may be stored in the financial account store 150.

The content store 140 stores content items associated with a user profile, such as images, videos or audio files. Content items from the content store 140 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social network system by displaying content related to users, objects, activities, or functionalities of the social networking system 105. Examples of social networking content items include suggested connections or suggestions to perform other actions, media provided to, or maintained by, the social networking system 105 (e.g., pictures or videos), status messages or links posted by users to the social networking system, events, groups, pages (e.g., representing an organization or commercial entity), and any other content provided by, or accessible via, the social networking system.

The content store 140 also includes one or more pages associated with entities having user profiles in the user profile store 135. An entity is a non-individual user of the social networking system 105, such as a business, a vendor, an organization or a university. A page includes content associated with an entity and instructions for presenting the content to a social networking system user. For example, a page identifies content associated with the entity's user profile as well as information describing how to present the content to users viewing the brand page. Vendors may be associated with pages in the content store 140, allowing social networking system users to more easily interact with the vendor via the social networking system 105. A vendor identifier is associated with a vendor's page, allowing the social networking system 105 to identify the vendor and/or to retrieve additional information about the vendor from the user profile store 135, the action log 130 or from any other suitable source using the vendor identifier. In some embodiments, the content store 140 may also store one or more targeting criteria associated with stored objects and identifying one or more characteristics of a user to which the object is eligible to be presented.

The action logger 125 receives communications about user actions on and/or off the social networking system 105, populating the action log 130 with information about user actions. Such actions may include, for example, adding a connection to another user, sending a message to another user, uploading an image, reading a message from another user, viewing content associated with another user, attending an event posted by another user, among others. In some embodiments, the action logger 125 receives, subject to one or more privacy settings, transaction information from a financial account associated with a user and identifies user actions from the transaction information. For example, the action logger 125 retrieves vendor identifiers from the financial account's transaction history and identifies an object, such as a page, in the social networking system associated with the vendor identifier. This allows the action logger 125 to identify a user's purchases of products or services that are associated with a page, or another object, in the content store 140. In addition, a number of actions described in connection with other objects are directed at particular users, so these actions are associated with those users as well. These actions are stored in the action log 130.

The action log 130 may be used by the social networking system 105 to track user actions on the social networking system 105, as well as external website that communicate information to the social networking system 105. Users may interact with various objects on the social networking system 105, including commenting on posts, sharing links, and checking-in to physical locations via a mobile device, accessing content items in a sequence or other interactions. Information describing these actions is stored in the action log 130. Additional examples of interactions with objects on the social networking system 105 included in the action log 130 include commenting on a photo album, communications between users, becoming a fan of a musician, adding an event to a calendar, joining a groups, becoming a fan of a brand page, creating an event, authorizing an application, using an application and engaging in a transaction. Additionally, the action log 130 records a user's interactions with advertisements on the social networking system 105 as well as other applications operating on the social networking system 105. In some embodiments, data from the action log 130 is used to infer interests or preferences of the user, augmenting the interests included in the user profile and allowing a more complete understanding of user preferences.

The action log 130 may also store user actions taken on external websites and/or determined from a financial account associated with the user. For example, an e-commerce website that primarily sells sporting equipment at bargain prices may recognize a user of a social networking system 105 through social plug-ins that enable the e-commerce website to identify the user of the social networking system 105. Because users of the social networking system 105 are uniquely identifiable, e-commerce websites, such as this sporting equipment retailer, may use the information about these users as they visit their websites. The action log 130 records data about these users, including webpage viewing histories, advertisements that were engaged, purchases made, and other patterns from shopping and buying. Actions identified by the action logger 125 from the transaction history of a financial account associated with the user allow the action log 130 to record further information about additional types of user actions.

In one embodiment, an edge store 145 stores the information describing connections between users and other objects on the social networking system 105 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 105, such as expressing interest in a page on the social networking system, sharing a link with other users of the social networking system, and commenting on posts made by other users of the social networking system. The edge store 145 stores edge objects that include information about the edge, such as affinity scores for objects, interests, and other users. Affinity scores may be computed by the social networking system 105 over time to approximate a user's affinity for an object, interest, and other users in the social networking system 105 based on the actions performed by the user. Multiple interactions between a user and a specific object may be stored in one edge object in the edge store 145, in one embodiment. In some embodiments, connections between users may be stored in the user profile store 135, or the user profile store 135 may access the edge store 145 to determine connections between users.

The cache management system 155 manages a cache (not shown) of the social networking system 105. The cache management system 155 caches (a) data that is frequently requested and (b) data that may be requested in the future by the user device 110. For example, the data can include time series data such as number of applications downloaded by a user in the last one hour, number of applications downloaded in a country, number of users who have visited a web page on an hourly basis for the last one week, etc. The cache management system 155 anticipates queries, pre-computes the result required for the anticipated queries and stores the pre-computed result in the cache. When the query actually arrives at the social networking system 105, the cache management system 155 fetches the result, which is already available in the cache, from the cache and returns it to the user device 110.

Figure 2:
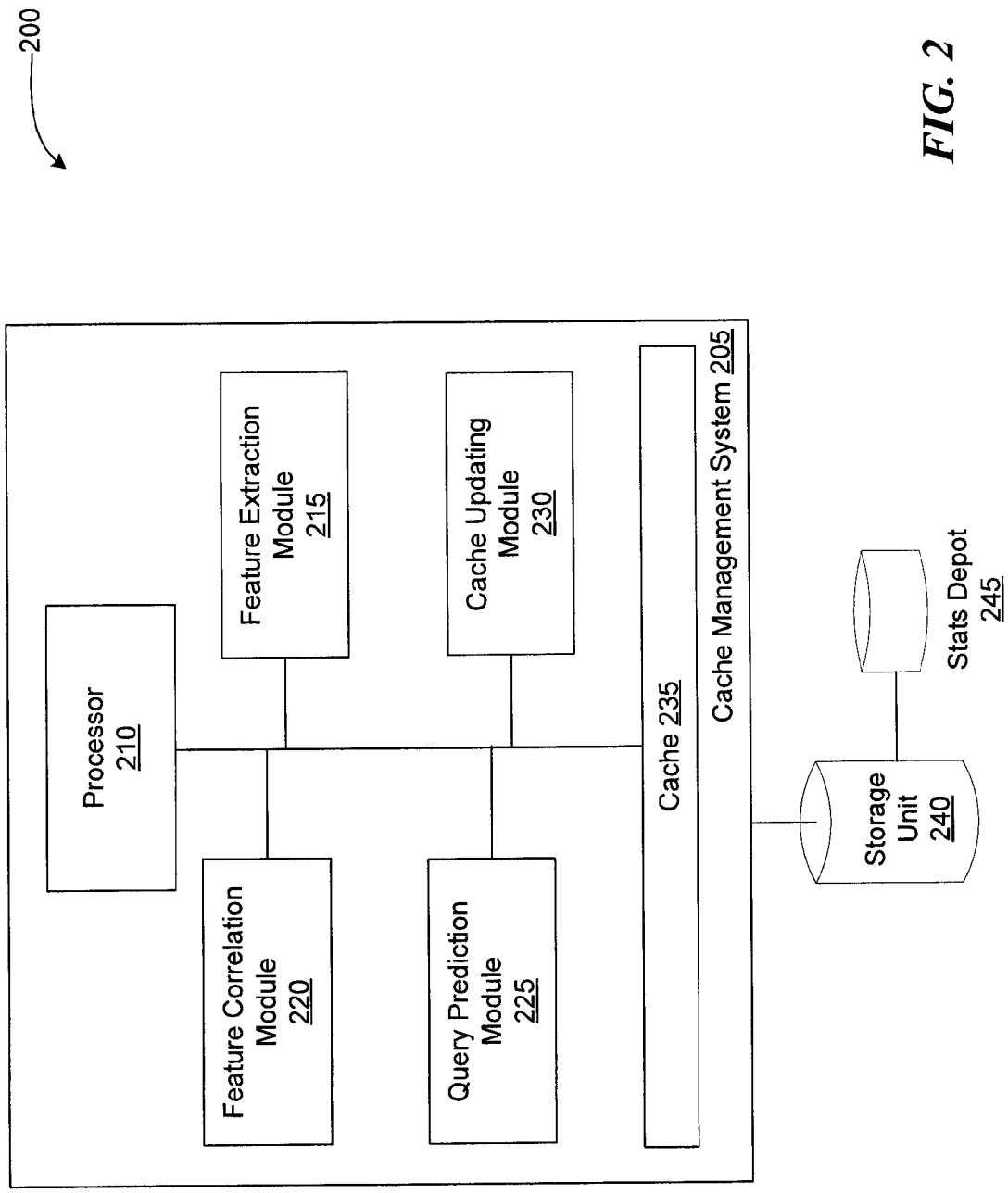
FIG. 2 is a block diagram illustrating a cache management system.

FIG. 2 is a block diagram illustrating a system 200 including a cache management system 205, according to an embodiment of the disclosed technique. In an embodiment, the cache management system 205 can be similar to the cache management system 155 of FIG. 1. Certain types of data in the social networking system 105 of FIG. 1 can be cached while other types of data may not be cached. However, regardless of whether the data is cacheable or not, the queries issued for both cacheable data and uncacheable data are used for predicting anticipated queries.

As described above with reference to FIG. 1, the cache management system 205 can be used to store time series data, such as number of applications downloaded by a user in the last one hour, number of applications downloaded in a country, number of users who have visited a web page on an hourly basis for the last one week, etc. The user may generate reports having such data frequently. For example, an advertiser hosting a web page in the social networking system 105 may want to know the number of users, age and gender of the users who visited their web page in the last forty eight hours. Such report may be generated on a daily basis. Further, the report may be generated per country, per city, etc. Accordingly, in order to minimize the delay in generating such reports, the cache management system 205 can obtain the data from the storage unit 240 and store the data in the cache 235.

Further, the cache management system 205 also intelligently caches data that may be required by future queries. By preloading the data that may be required in the future, the data retrieval performance is improved significantly. The user may not see any difference in the processing time for frequently issued queries and new queries. In an embodiment, future queries are predicted using the knowledge gained from the previously executed queries. The cache management system 205 obtains the data required by the anticipated queries from the storage unit 240 and stores the data in the cache 235. The cache management system 205 stores the queries executed by the social networking system 105 in a storage unit such as the stats depot 245. The queries may also be stored in other storage units of the social networking system 105. Further, the stats depot 245 can be part of any of the existing storage units or an additional storage unit in the social networking system 105.

An aspect of previously executed queries that is used in predicting future queries is referred to as a feature of a query. A feature is a characteristic of a query. An example query 300 and its features are described with reference to FIG. 3. A query may be written using various query languages including SQL. The syntax and keywords of the query depend on the query language. The query 300 includes features such as "Select" 305, "From" 310, "Filter" 315, "Range" 320 and "Window Size" 325. A select feature specifies the data to be retrieved by the query. The select feature 305 includes data such as number of applications downloaded by a user, userID, gender, age and country of the user. The data can be a computed/processed value, such as count (appID), or raw value from a database table. The data in select feature 305 are columns of "applications_table" in the storage unit 240.

The from feature 310 indicates the source of the data, i.e. where the data can be obtained from. In an embodiment, the source of the data can be a database table. The filter feature 315 indicates a filter for the data. In the example query 300, the filter feature 315 includes a country name, i.e., the country for which the data is obtained. The filter feature may also be specified using other keywords such as "where," "having," etc. Further, the range feature 320 indicates a period for which the data is obtained. The range feature 320 can include a start date and an end date. In an embodiment, the end date can have a default value of current date. The window size feature 325 indicates an interval for which the data is obtained. For example, window size of "hourly" in query 300 obtains data, such as number of applications downloaded, per hour for every hour in the specified period.

The data can be stored in the storage unit 240 at different granularities. For example, the storage unit 240 may have the data on a minute basis. If a query requires data at a different granularity level than what is stored in the storage unit 240, the data is processed to the required granularity level before it is delivered. For example, for the query 300, the data is aggregated to an hourly basis before it is delivered to the user device 110. Accordingly, the data stored in the storage unit 240 may not be in the same form as required by the query 300. That is, the results may have to be computed after obtaining the data from the storage unit 240. In another example, the count (appID), i.e., a count of the applications downloaded, is a computed value which is not stored in the storage unit 240. Filtering the data for a country is also a computed result. In an embodiment, the cache management system 205 caches the data in a form required by the query 300.

Caching the results in a form required by the queries eliminates the need to process the results every time a query is issued and thereby improves performance of the data retrieval process. In order to determine how and what data (for example, type of data, granularity level, processed or as is from the database table) has to be cached, the cache management system 205 identifies a usage pattern of the features from the previously executed queries, predicts future queries based on the usage pattern, and obtains the data for the predicted queries ahead of the receipt of the queries.

A feature extraction module 215 extracts the features of each of the queries stored in the stats depot 245. The features extracted can include features such as features 305-325 of query 300. In another embodiment, a query can have more and/or different features than query 300. As described earlier, the feature may include any characteristic of a query. The extracted features are stored in the stats depot 245. In an embodiment, the extracted features can be stored in other storage units of the social networking system 205.

A feature correlation module 220 correlates the extracted features to identify a usage pattern of the features. Identifying the usage pattern includes identifying the data obtained frequently, whether the data obtained is as is from the storage unit 240 or processed/computed values, the period for which the data is obtained, the granularity level of the data, a frequency at which a particular query is received, a filter criteria in the query, a user/application from which the query is received, an application for which the query is received, etc. The feature correlation module 220 can use various techniques for identifying the usage pattern.

The feature correlation module 220 may consider actual values for certain features and derived values for certain features in identifying the usage pattern. For example, for the filter feature, the actual values such as "Country=USA," "Gender=Male" may be considered in identifying the usage pattern. In the case of range feature which has "start_date=Sep. 1, 2012" and end date="Sep. 30, 2012", a derived value such as "One month" is considered for the usage pattern rather than the actual values of the start date and the end date. By considering the derived value of the range filter rather than the actual values, the cache management 205 can identify for what period the data is requested, and would know when to refresh the cache with new data as time progresses. For example, if the frequently issued queries are queries for obtaining data for the last twenty four hours from current time, the feature correlation module 220 identifies that the data is requested on a daily basis and therefore, the cache management system 205 caches data for twenty four hour periods from the current time. Further, the cache management system 205 refreshes the cache 235 with new data as time progresses.

Further, the feature correlation module 220 also identifies the granularity of the data requested frequently. That is, whether the data is requested on, for example, per hour, per day, per week, per country, per age group etc. In an embodiment, the cache management system 205 can cache the data in the most frequently requested granularity level. If the data in the storage unit 240 is not in the same granularity level, it is aggregated to the required granularity level before caching. The cache is highly adaptive in the granularity level of data it stores—from a final requested answer to raw data that is obtained from the storage unit.

The query prediction module 225 predicts queries that may be received in the future based on the usage pattern identified by the feature correlation module 220. The query prediction module 225 may use various prediction techniques for predicting the queries. In one embodiment, the query predication module determines a probability of occurrence of each the features identified by the query correlation module 200. If the probability of the feature exceeds a particular threshold the query prediction module 225 determines that the feature may reappear in the future queries.

The cache updating module 230 updates the cache 235 with data necessary to serve current and future queries. Updating the cache 235 includes both writing data into the cache 235 and evicting data from the cache 235. The cache updating module 230 obtains the data from the storage unit 240 and writes the data to cache 235. The data to be written into the cache 235 may be determined by the query prediction module 225. In an embodiment, the cache updating module 230 may process/aggregate the data obtained from the storage unit 240 before writing the data to the cache 235. Further, while the cache updating module 230 caches certain type of data, it may not, in certain embodiments, cache certain other type of data, for example, rapidly changing data. However, features from queries issued for both cacheable data and uncacheable data are considered for predicting the future queries.

The cache updating module 230 may combine a read request for obtaining new data for predicted future queries with other read requests. For example, a read request for the new data may be combined with a read request for obtaining data for current queries. Combining the read requests makes the data retrieval process more efficient by minimizing number of reads of the storage unit 240 and thus, reducing the time consumed for retrieving the data. In another embodiment, read requests for new data may be scheduled based on various scheduling policies.

Data to be evicted from the cache 235 may be determined based on a predefined eviction policy. The predefined eviction policy includes purging the data based on at least one of (a) a weighted least recently used basis, (b) a determination of whether the data in the cache will be requested by future queries, (c) access pattern of data over a predefined duration, and (e) low inter-reference recency set. For example, if a set of data to be evicted from the cache 235 have the same time stamp, then the data belonging to a user/application that is accessed lesser number of times or less frequently is evicted. In another example, between a set of aggregated/processed data and another set of non-processed/aggregated data, the set of non-processed/aggregated data is evicted. The predefined eviction policy can include various other policies that can help in managing cache 235 efficiently.

Figure 4:
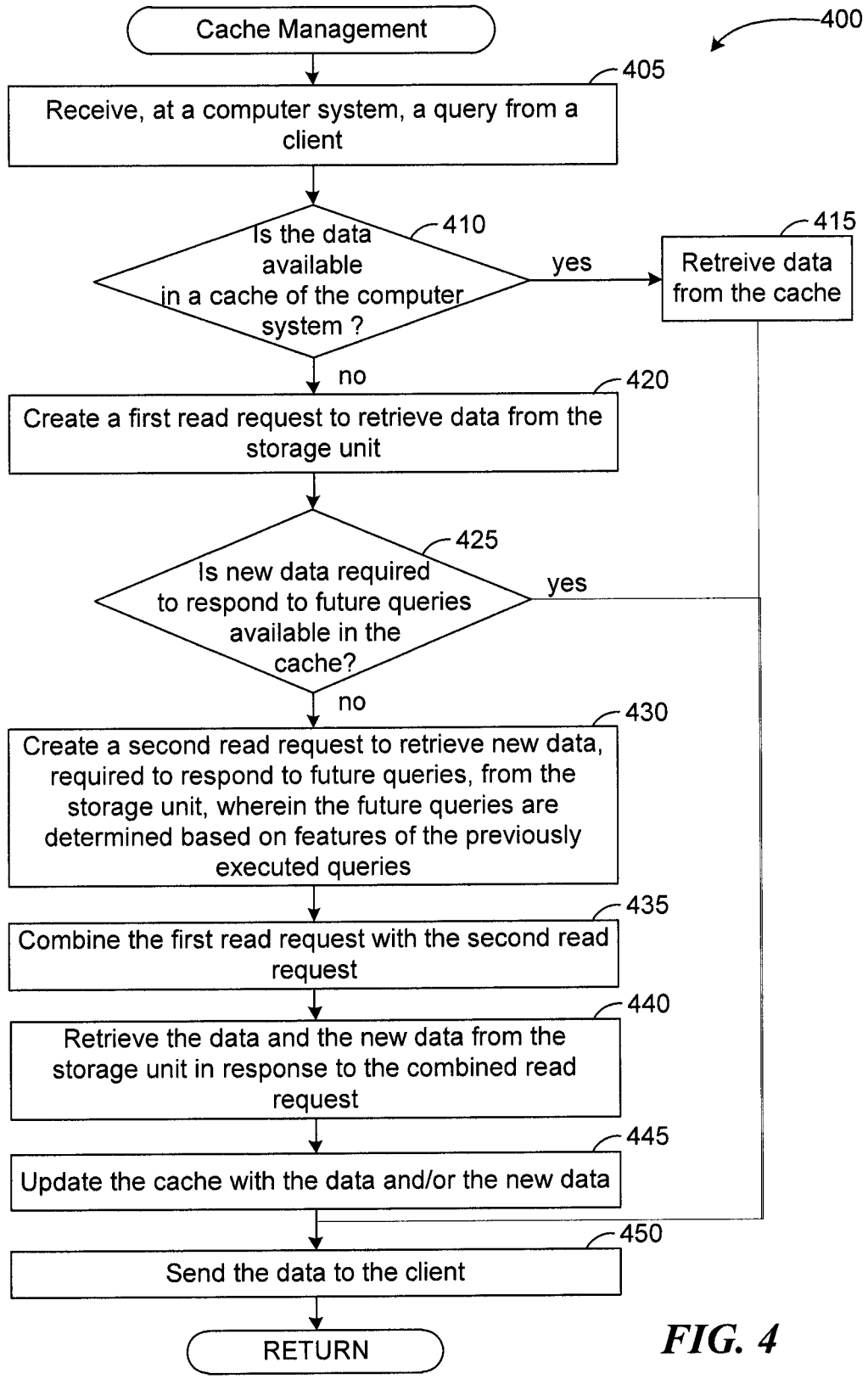
FIG. 4 is a flow diagram illustrating a process of cache management.

FIG. 4 is a flow diagram illustrating a process of cache management, according to an embodiment of the disclosed technique. The process 400 may be executed in a system such as system 200 of FIG. 2. At step 405, the system 200 receives a query from a client. At determination step 410, the processor 210 determines whether data required for responding to the query is available in a cache of the system. Responsive to a determination that the data is in the cache, at step 415, the processor 210 retrieves the data from the cache and transfers the control to step 450.

On the other hand, responsive to a determination that the data is not available in the cache, at step 420, the processor 210 creates a first read request to read the data from the storage unit. At step 425, the cache updating module 230 determines whether new data required to serve predicted queries is available in the cache. Responsive to a determination that the new data is not available in the cache, the processor 210 creates a second read request to read the new data from the storage unit.

At step 435, the processor 210 combines the first read request and the second read request. At step 440, processor 210 retrieves the data and the new data from the storage unit in response to the combined read request. At step 445, the cache updating module 230 updates the cache with the data and the new data. At step 450, the system 200 sends the data to the client.

Referring back to step 435, in an embodiment, the read requests for data and the new data are combined to make the data retrieval process more efficient by minimizing number of reads of the storage unit. However, in another embodiment, read requests for new data may be executed separately and may be scheduled based on various scheduling policies.

Figure 5:
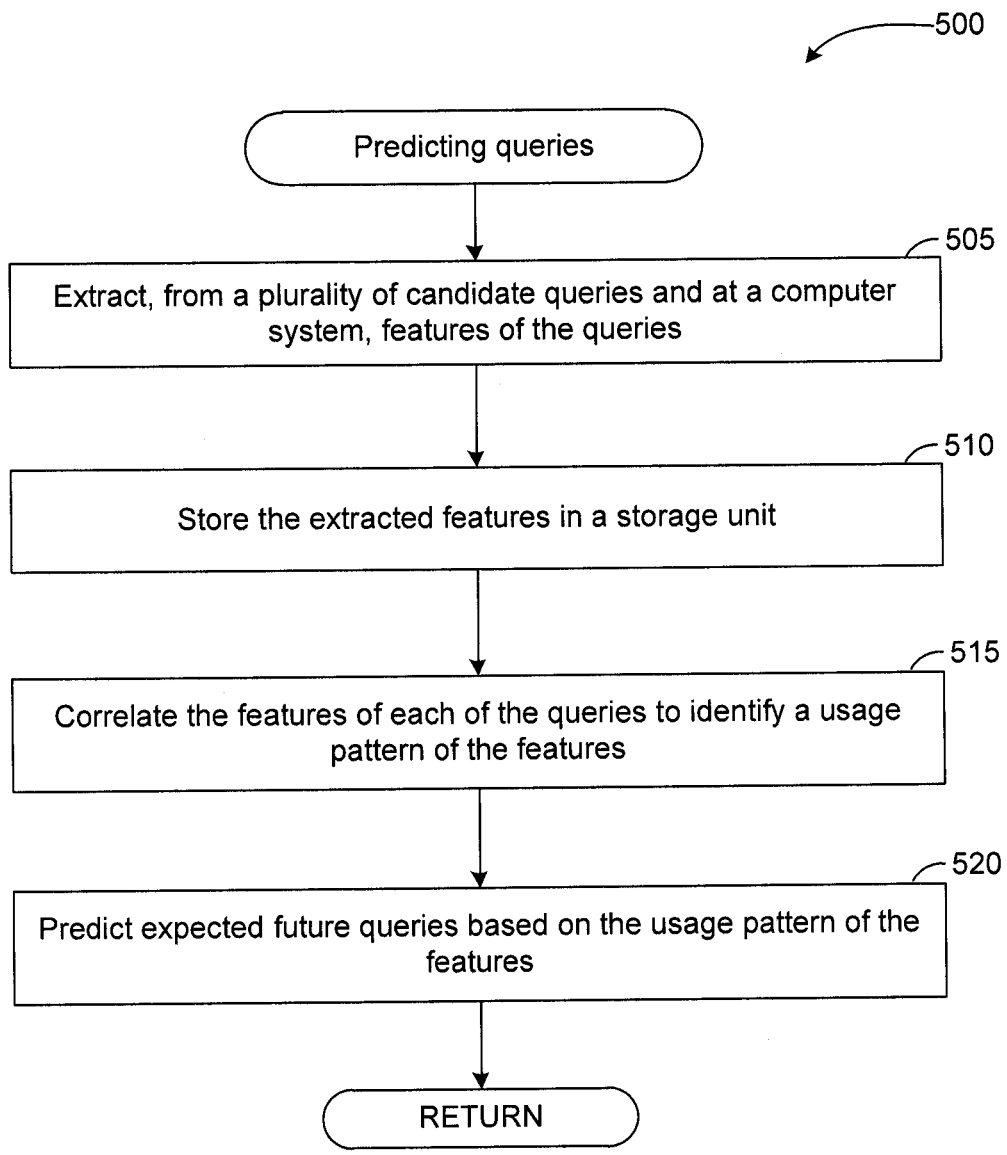
FIG. 5 is a flow diagram illustrating a process of predicting queries.

FIG. 5 is a flow diagram illustrating a process 500 for predicting queries, according to an embodiment of the disclosed technique. The process 500 may be executed in a system such as system 200 of FIG. 2. At step 505, the feature extraction module 215 extracts the features from each of the queries stored in a stats depot. The queries stored in the stats depot can include previously executed queries. At step 510, the extracted features are stored in the stats depot. In certain embodiments, the stats depot may also store derived features of queries, such as input data characteristics of queries. At step 515, the feature correlation module 220 correlates the stored features to identify the usage pattern of the features. At step 520, the query prediction module predicts the future queries based on the identified usage pattern of the features.

Referring to step 505, the queries may be stored in the stats depot based on a pre-defined query storing policy. The pre-defined query storing policy includes storing at least one of (a) queries received over a pre-defined duration, (b)

queries received by a particular application, (c) queries received for a particular application, or (d) a particular type of queries received.

Figure 6:
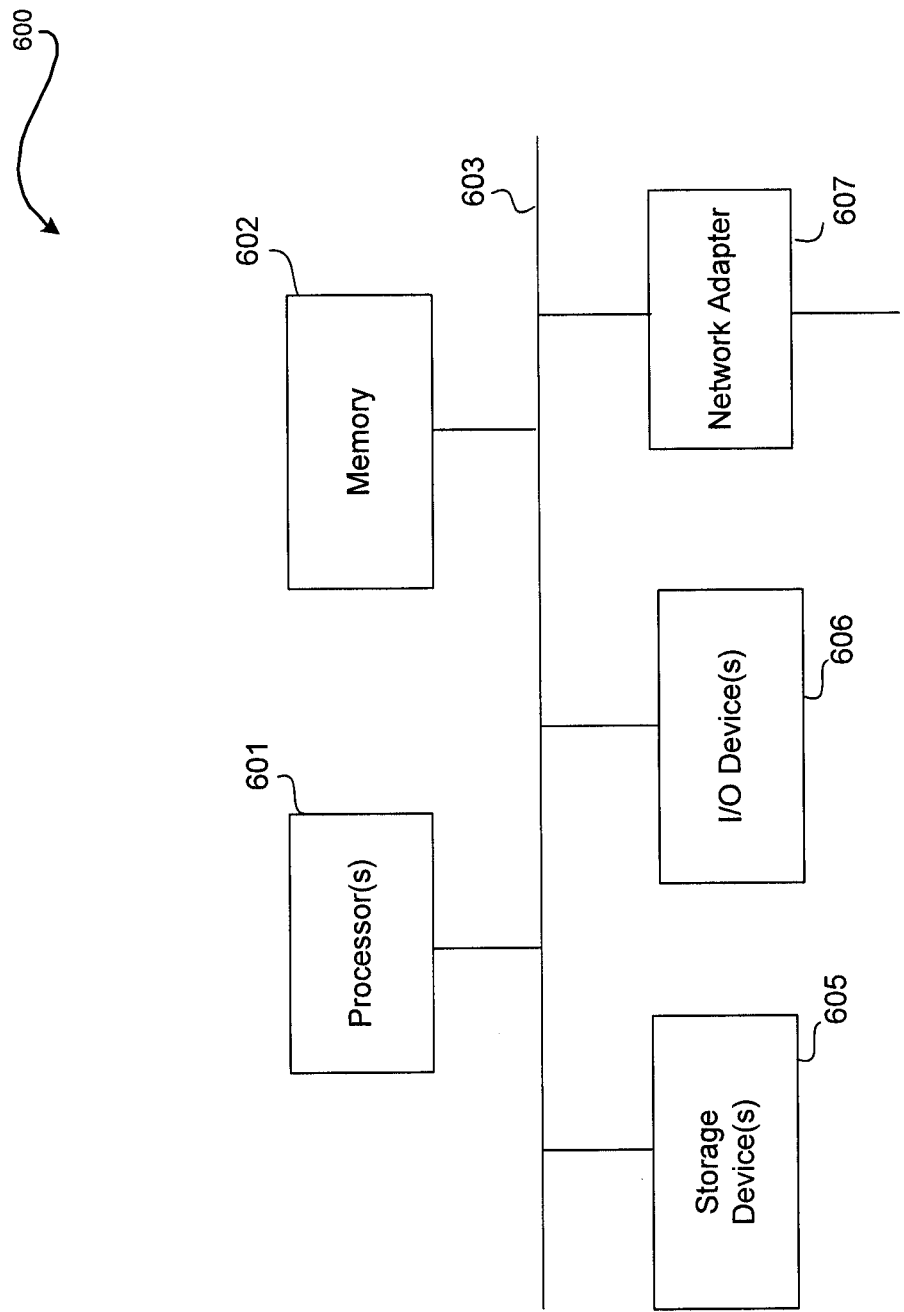
FIG. 6 is a block diagram of a processing system that can implement operations of the present invention.

FIG. 6 is a block diagram of an apparatus that may perform various operations, and store various information generated and/or used by such operations, according to an embodiment of the disclosed technique. The apparatus can represent any computer or processing system described herein. The processing system 600 is a hardware device on which any of the entities, components or services depicted in the examples of FIGS. 1-5 (and any other components described in this specification) can be implemented, such as a cache management system, client, storage devices, databases, social networking system, etc. The processing system 600 includes one or more processors 601 and memory 602 coupled to an interconnect 603. The interconnect 603 is shown in FIG. 6 as an abstraction that represents any one or more separate physical buses, point to point connections, or both connected by appropriate bridges, adapters, or controllers. The interconnect 603, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 601 is/are the central processing unit (CPU) of the processing system 600 and, thus, control the overall operation of the processing system 600. In certain embodiments, the processor(s) 601 accomplish this by executing software or firmware stored in memory 602. The processor(s) 601 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 602 is or includes the main memory of the processing system 600. The memory 602 represents any form of random access memory (RAM), read-only memory (ROM), flash memory, or the like, or a combination of such devices. In use, the memory 602 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) 601 through the interconnect 603 are a network adapter 607, a storage device(s) 605 and I/O device(s) 606. The network adapter 607 provides the processing system 600 with the ability to communicate with remote devices, over a network and may be, for example, an Ethernet adapter or Fibre Channel adapter. The network adapter 607 may also provide the processing system 600 with the ability to communicate with other computers within the cluster. In some embodiments, the processing system 600 may use more than one network adapter to deal with the communications within and outside of the cluster separately.

The I/O device(s) 606 can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device.

The code stored in memory 602 can be implemented as software and/or firmware to program the processor(s) 601 to carry out actions described above. In certain embodiments, such software or firmware may be initially provided to the processing system 600 by downloading it from a remote system through the processing system 600 (e.g., via network adapter 607).

The techniques introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

A machine-accessible storage medium or a storage device (s) 605 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, can include, for example, programmable circuitry programmed with specific software and/or firmware, special-purpose hardwired circuitry, or a combination thereof.

What is claimed is:

1. A method comprising:
   generating, at a computer system and in response to receiving a specified query from a client, a first read request for obtaining a result of the specified query from a storage system;
   extracting, from a plurality of candidate queries and at the computer system, a plurality of features of the candidate queries, wherein the features are characteristics of a query;
   correlating the features of each of the candidate queries to identify a usage pattern of the features, the correlating including:
   identifying a specified feature of the features based on a derived value of the specified feature, the derived value being derived from an actual value of the specified feature, the actual value and the specified feature specified in one or more of the candidate queries;

predicting, based on the usage pattern of the features, a set of queries to be received at the computer system in the future;
executing a query of the set of queries to obtain data corresponding to the query from the storage system, the data including time series data, wherein the data is stored at a first granularity level in the storage system, wherein executing the query includes:
  generating a second read request to obtain the data corresponding to the query,
  combining the first read request and the second read request to generate a combined read request, and
  executing the combined read request at the storage system to obtain the result of the specified query and the data corresponding to the query;
determining, based on the predicting, a second granularity level at which the data is to be cached, the second granularity level being different from the first granularity level;
processing the data from the first granularity level to the second granularity level to generate processed data; and
updating a cache of the computer system with the processed data, the updating to be performed before any of the set of queries is received at the computer system.

2. The method of claim 1 further comprising:
retrieving, in response to a specific query received at the computer system from a client, specific data from the cache; and
sending the specific data to the client.

3. The method of claim 1, wherein the features of the candidate queries include at least one of (a) a select clause with data fields indicating data to be retrieved, (b) a table name, (c) a filter value in a query, (d) a window-size of data requested, or (e) a date-range of the data requested.

4. The method of claim 1, wherein the candidate queries include previously executed queries.

5. The method of claim 1, wherein correlating the features includes:
identifying features based on a frequency of appearance of the features in the previously received queries.

6. The method of claim 1, wherein predicting the future queries includes:
determining a probability of appearance of one or more correlated features in the future queries, and
determining the one or more correlated features whose probability exceeds a predefined threshold, as predicted features appearing in the future queries.

7. The method of claim 6, wherein updating the cache with the data responsive to the future queries includes:
obtaining, from a storage unit, new data corresponding to the predicted features, and
writing the new data into the cache.

8. The method of claim 7, wherein obtaining the new data corresponding to the predicted features includes:
combining a first read request with a second read request to generate a combined request, the first read request for obtaining data corresponding to a current query, the second read request for obtaining the new data corresponding to the predicted features, and
obtaining, from the storage unit, the data and the new data in response to the combined request.

9. The method of claim 7, wherein updating the cache includes:
determining whether the cache has sufficient space to store the new data, and
responsive to a determination that the cache does not have sufficient space to store the new data, purging a portion of existing data from the cache based on a predefined data eviction policy.

10. The method of claim 9, wherein the predefined data eviction policy includes purging the portion of existing data based on at least one of (a) a weighted least recently used basis, (b) a determination of whether the portion of existing data in the cache will be requested by future queries, or (c) access pattern of the portion of existing data over a pre-defined duration.

11. The method of claim 7, wherein writing the new data into the cache includes processing the new data obtained from the storage unit to a form required by the future queries.

12. The method of claim 11, wherein processing the new data to a form required by the future queries includes aggregating the new data obtained from the storage unit.

13. The method of claim 1, wherein extracting the features from candidate queries include:
storing previously executed queries in a storage unit of the computer system based on a pre-defined query selection policy; and
storing the features of each of the previously executed queries.

14. The method of claim 13, wherein the pre-defined query storing policy includes storing at least one of (a) queries received over a pre-defined duration, (b) queries received by a particular application, (c) queries received for a particular application, or (d) a particular type of queries received.

15. The method of claim 1, wherein the candidate queries include at least one of (a) a first type of queries that retrieve cacheable data, or (b) a second type of queries that retrieve uncacheable data.

16. The method of claim 15, wherein correlating the features of the candidate queries includes correlating the features of candidate queries of both the first type and the second type.

17. A method comprising:
receiving a query at a computer system from a client;
generating, at the computer system, a first read request for obtaining data required to respond to the query;
determining whether data required to respond to the query is in a cache of the computer system;
responsive to a determination that the data is in the cache, retrieving, in response to the query, the data from the cache, the cache containing (a) the data required to respond to the query and (b) new data required to respond to future queries, wherein the future queries are predicted based on a correlation of features of (i) the query and (ii) previously executed queries, wherein the correlation of features is performed by:
identifying a specified feature of the features based on a derived value of the specified feature, the derived value being derived from an actual value of the specified feature, the actual value and the specified feature specified in the query or the previously executed queries, wherein the data and the new data include time series data; and
responsive to a determination that the data is not in the cache,
generating a second read request to obtain the new data,
combining the first read request and the second read request to generate a combined read request, and
executing the combined read request at a storage unit to obtain the data and the new data, wherein the new data is stored at a first granularity level in the storage unit, determining based on the future queries, a second granularity level at which the new data is to be cached, the second granularity level being different from the first granularity level, processing the new data from the first granularity level to the second granularity level, and updating the cache with (1) the data and (2) the new data, the cache updated with the new data before any of the set of queries is received at the computer system; and sending, in response to the query, the data to the client.

18. The method of claim 17, wherein the new data is processed to the second granularity level before being stored in the cache.

19. An apparatus comprising:

a computer system having a processor that processes a specified query received from a client, by obtaining data from a storage unit or a cache, the process further configured to generate a first read request for obtaining a result of the specified query from a storage system;

a feature extraction module working in cooperation with the processor to extract, from previously received queries, features of the queries, wherein the features are characteristics of a query;

a feature correlation module to correlate the features of the queries to identify a usage pattern of the features, wherein the feature correlation module is configured to correlate by:

identifying a specified feature of the features based on a derived value of the specified feature, the derived value being derived from an actual value of the specified feature, the actual value and the specified feature specified in one or more of the queries;

a query prediction module to:

predict, based on the usage pattern of the features, a set of queries to be received at the computer system in the future, and execute a query of the set of queries to obtain data corresponding to the query from the storage system, the data including time series data, wherein the data is stored at a first granularity level in the storage system, wherein executing the query includes:

generating a second read request to obtain the data corresponding to the query, combining the first read request and the second read request to generate a combined read request, and executing the combined read request at the storage system to obtain the result of the specified query and the data corresponding to the query, wherein the query determination module is further configured to determine based on the prediction, a second granularity level at which the data is to be cached, the second granularity level being different from the first granularity level; and a cache updating module to:

process the data from the first granularity level to the second granularity level to generate processed data, and update the cache with the processed data required to serve the set of queries, wherein the cache module is configured to update the cache before any of the set of queries is received at the computer system.

* * * * *